Fig. 7

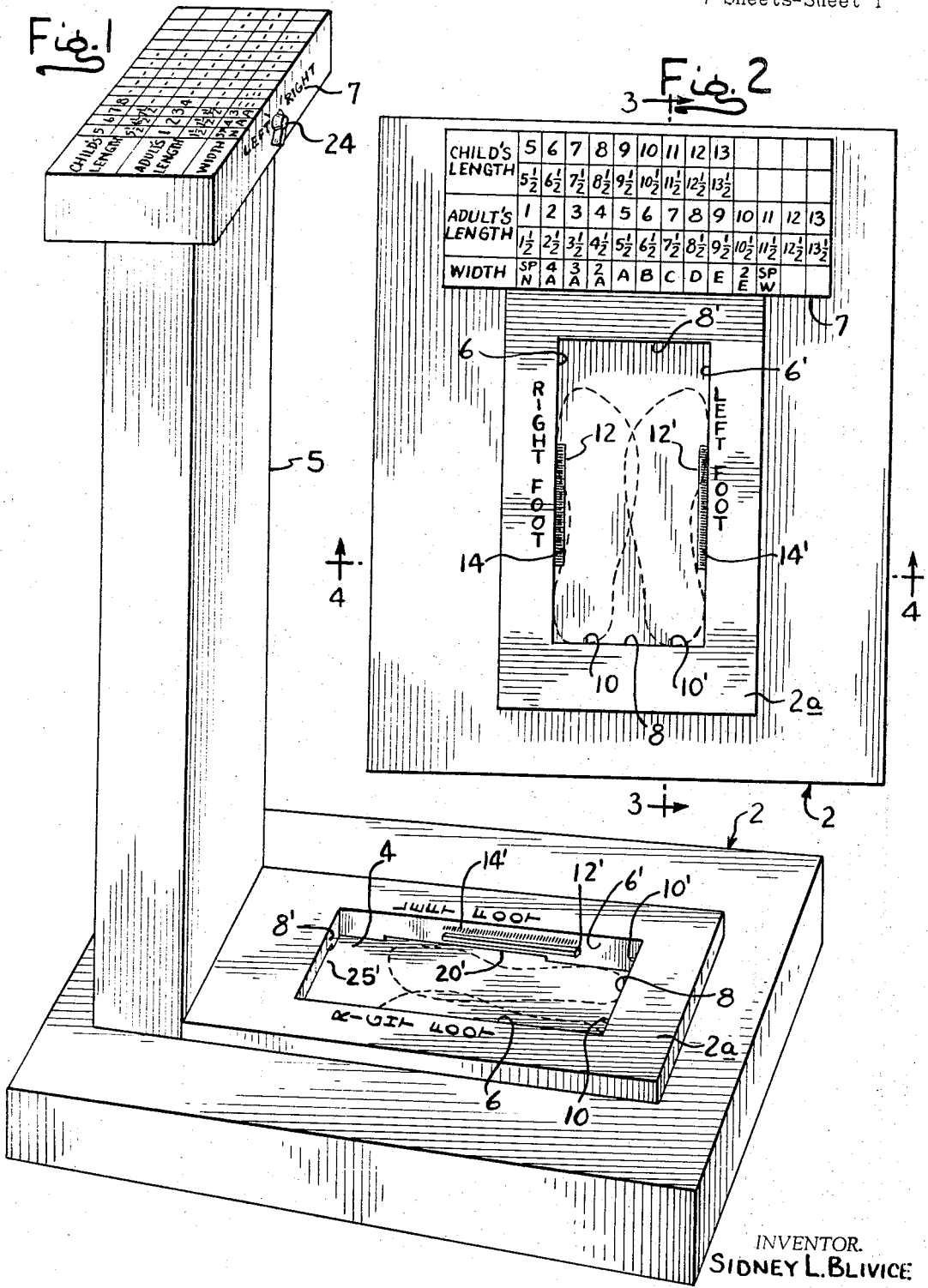

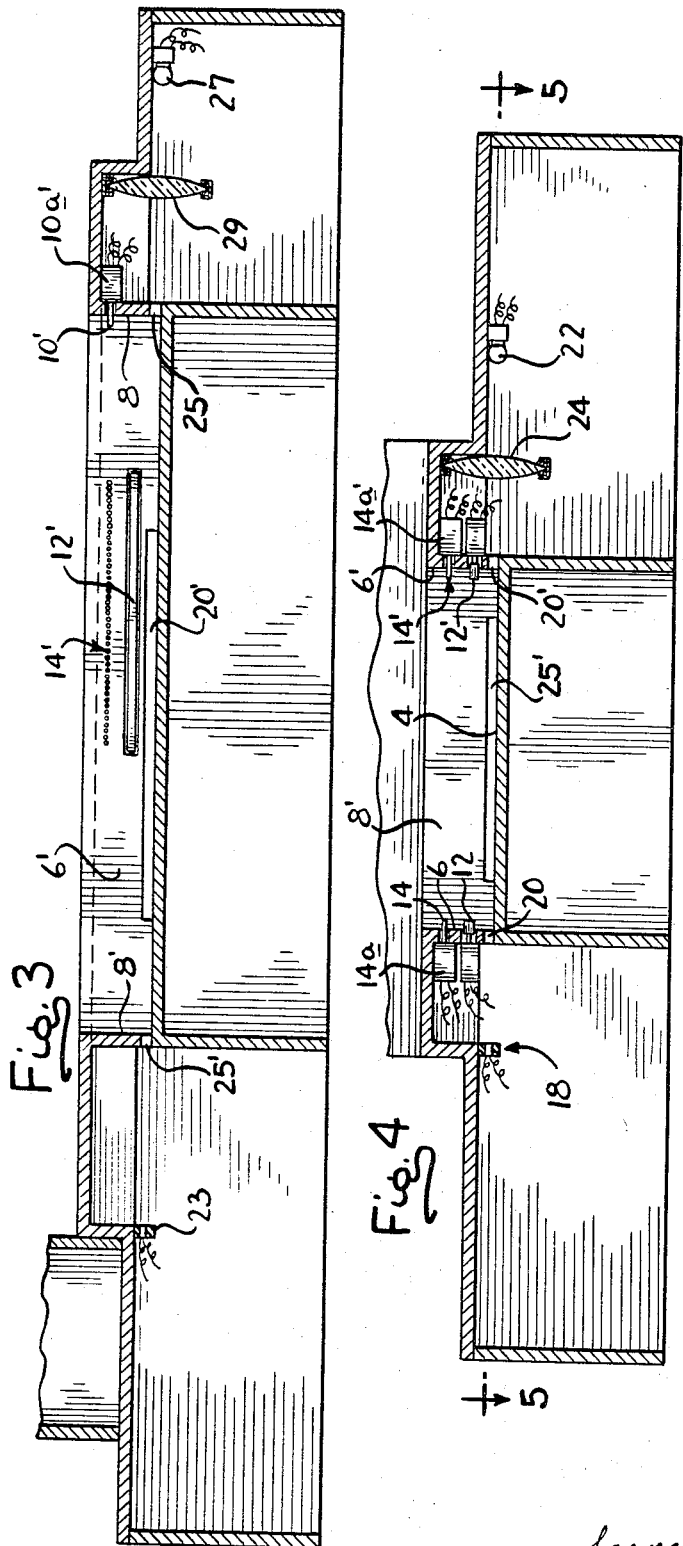

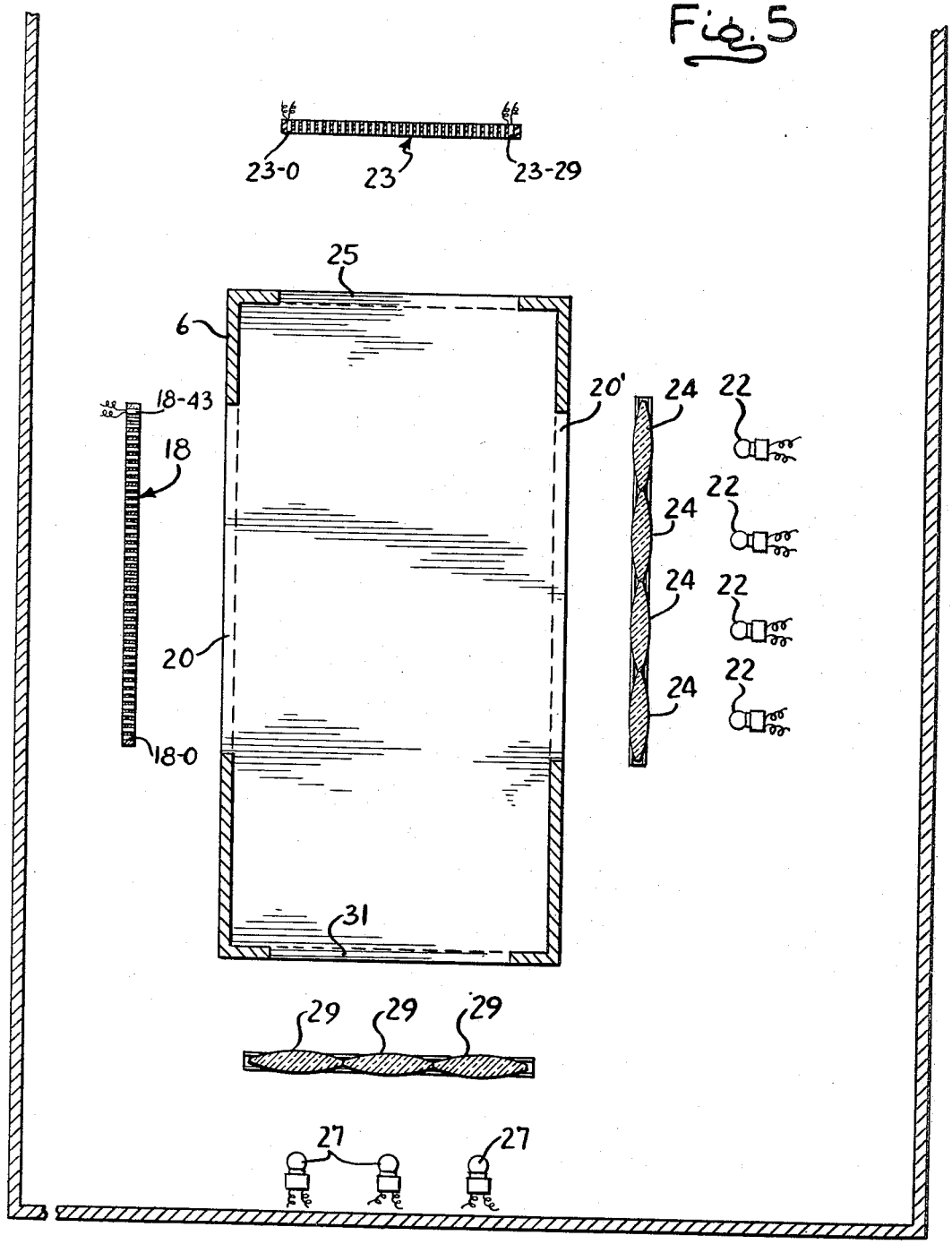

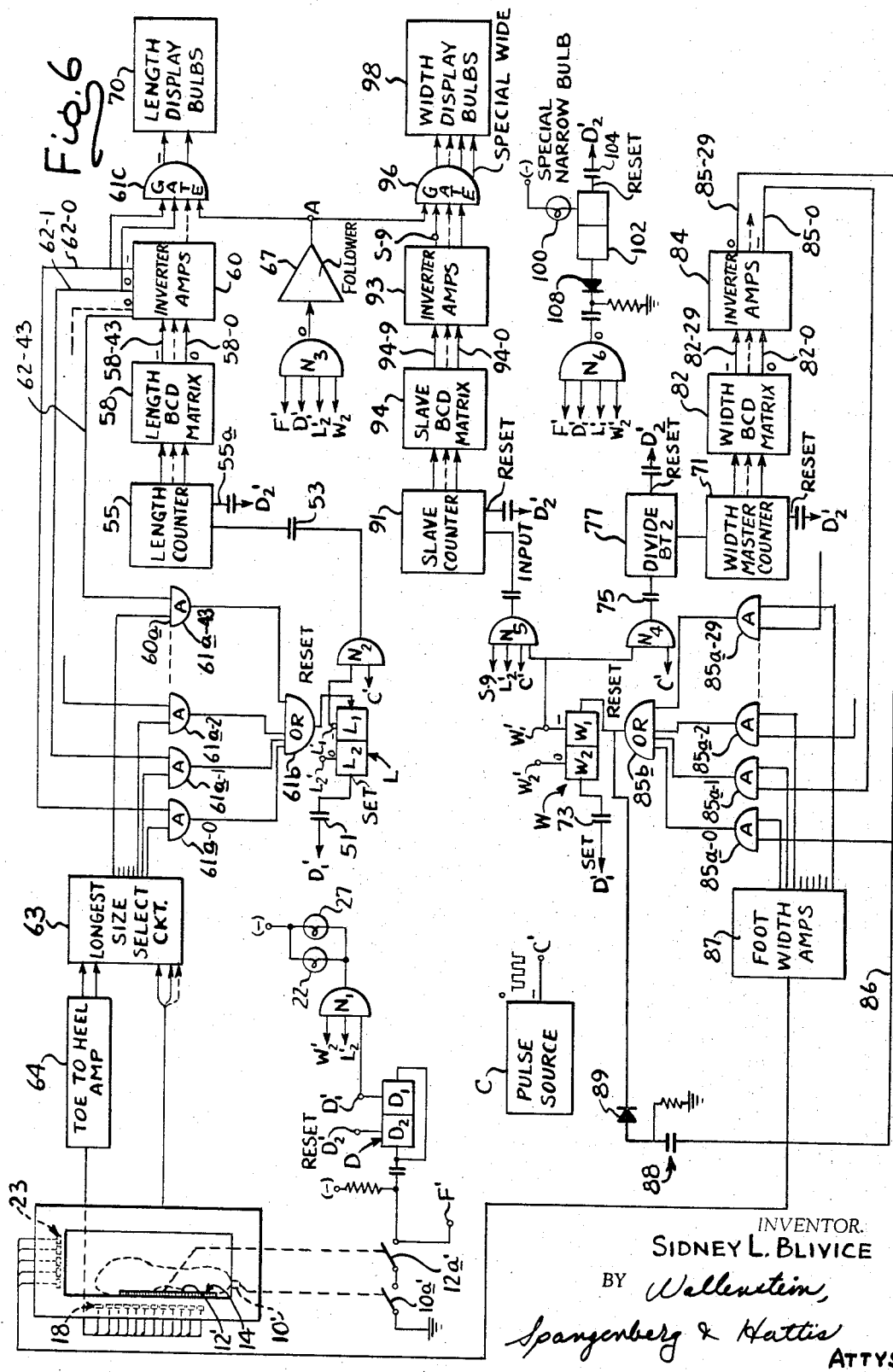

| SLAVE COUNTER | 0 | 1 | 2 | 3 | 4 | 5 | 6 | 7 | 8 | 9 |
|---|---|---|---|---|---|---|---|---|---|---|
| ADULTS | | | | | | | | | | |
| 13 | 20 | 21 | 22 | 23 | 24 | 25 | 26 | 27 | 28 | 29 |
| 12 | 19 | 20 | 21 | 22 | 23 | 24 | 25 | 26 | 27 | 28 |
| 11 | 19 | 20 | 21 | 22 | 23 | 24 | 25 | 26 | 27 | |
| 10 | 18 | 19 | 20 | 21 | 22 | 23 | 24 | 25 | 26 | |
| 9 | 17 | 18 | 19 | 20 | 21 | 22 | 23 | 24 | 25 | |
| 8 | 16 | 17 | 18 | 19 | 20 | 21 | 22 | 23 | 24 | |
| 7 | 15 | 16 | 17 | 18 | 19 | 20 | 21 | 22 | 23 | |
| 6 | 14 | 15 | 16 | 17 | 18 | 19 | 20 | 21 | 22 | |
| 5 | 13 | 14 | 15 | 16 | 17 | 18 | 19 | 20 | 21 | |
| 4 | 12 | 13 | 14 | 15 | 16 | 17 | 18 | 19 | 20 | |
| 3 | 11 | 12 | 13 | 14 | 15 | 16 | 17 | 18 | 19 | |
| 2 | 10 | 11 | 12 | 13 | 14 | 15 | 16 | 17 | 18 | |
| 1 | 9 | 10 | 11 | 12 | 13 | 14 | 15 | 16 | 17 | |
| CHILDREN | | | | | | | | | | |
| 13 | 8 | 9 | 10 | 11 | 12 | 13 | 14 | 15 | 16 | |
| 12 | 7 | 8 | 9 | 10 | 11 | 12 | 13 | 14 | 15 | |
| 11 | 6 | 7 | 8 | 9 | 10 | 11 | 12 | 13 | 14 | |
| 10 | 5 | 6 | 7 | 8 | 9 | 10 | 11 | 12 | 13 | |
| 9 | 4 | 5 | 6 | 7 | 8 | 9 | 10 | 11 | 12 | |
| 8 | 3 | 4 | 5 | 6 | 7 | 8 | 9 | 10 | 11 | |
| 7 | 2 | 3 | 4 | 5 | 6 | 7 | 8 | 9 | 10 | |
| 6 | 1 | 2 | 3 | 4 | 5 | 6 | 7 | 8 | 9 | |
| 5 | 0 | 1 | 2 | 3 | 4 | 5 | 6 | 7 | 8 | 9 |
| WIDTH | AAAA | AAA | AA | A | B | C | D | E | EE | SPECIAL WIDE |

INVENTOR.
SIDNEY L. BLIVICE
BY Wallenstein,
Spangenberg & Hattis
ATTYS.

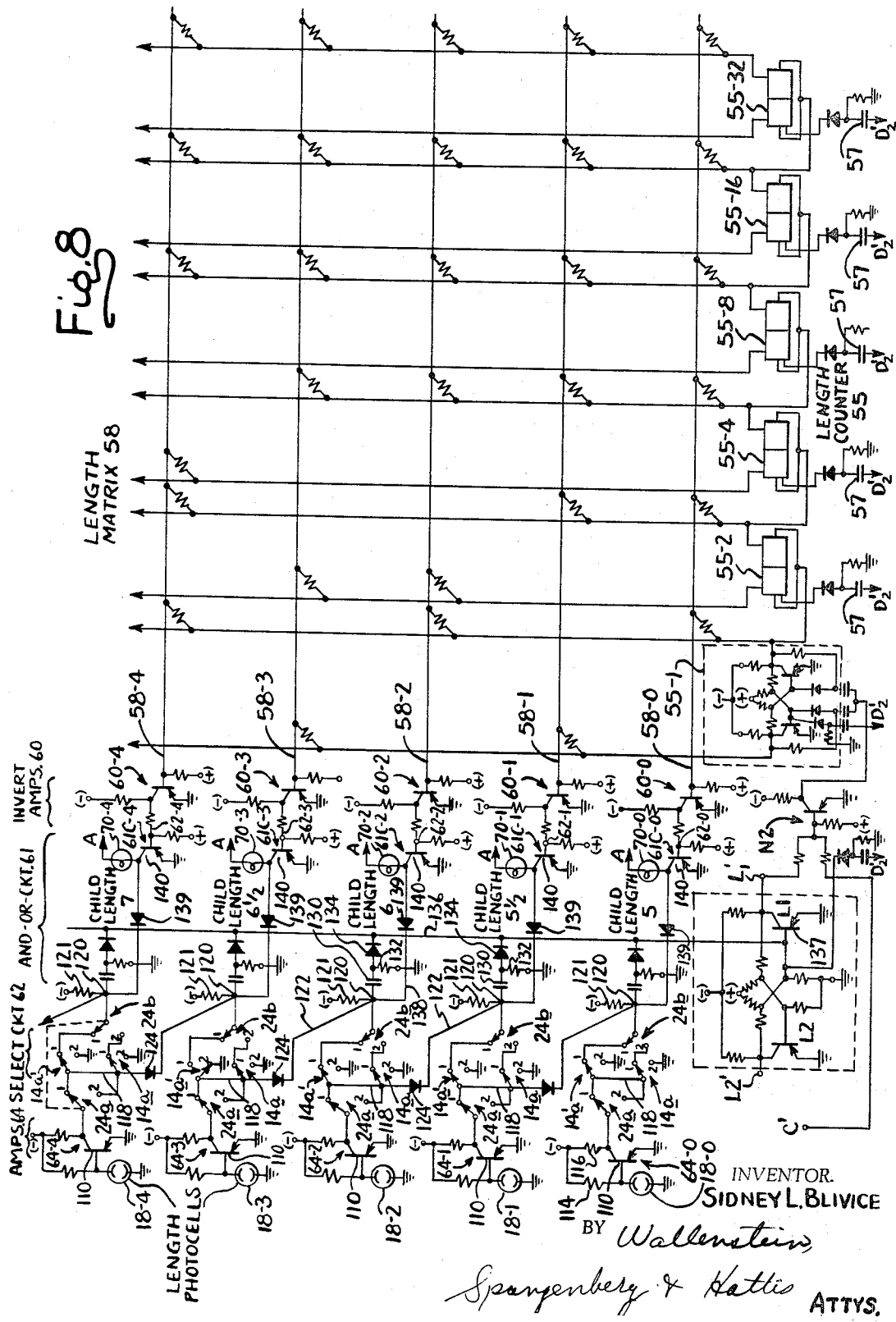

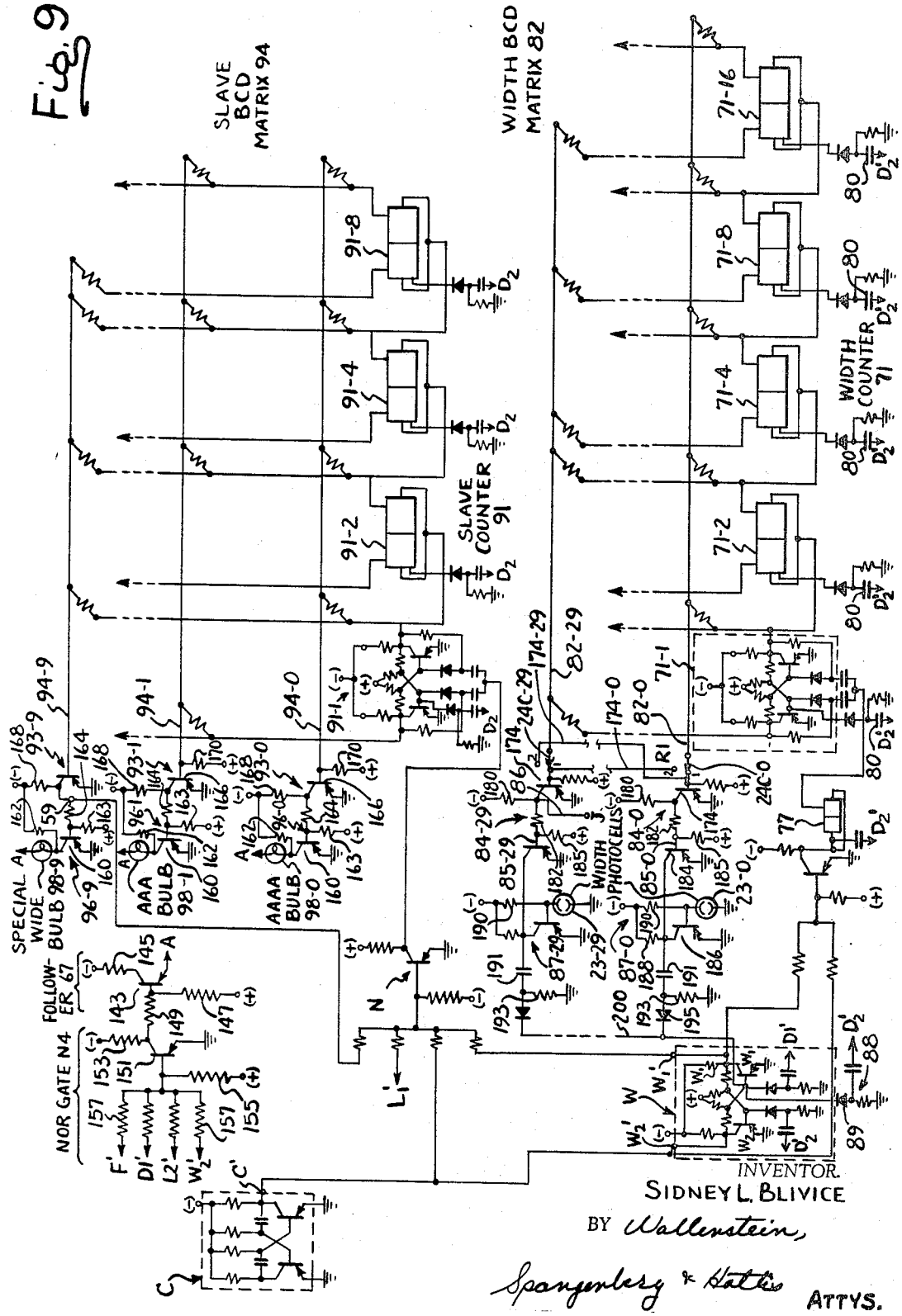

United States Patent Office 3,328,882
Patented July 4, 1967

3,328,882
AUTOMATIC SHOE SIZE INDICATING
APPARATUS
Sidney Lee Blivice, Chicago, Ill., assignor of one-half to
David J. Cohen, Skokie, Ill.
Filed Feb. 24, 1964, Ser. No. 346,601
8 Claims. (Cl. 33—3)

The present invention relates to shoe size indicating apparatus, which has particular utility in a self-service store where the apparatus is used by the customers to measure the shoe length and width classification required by their feet.

One of the most important factors affecting selling costs in retail merchandising operations is salaries and commissions of sales personnel. To reduce these costs self-service discount and department stores have become a popular mode of retail merchandising. However, this form of merchandising has not heretofore been practical or popular for selling goods requiring custom fitting, such as shoes and particularly children's shoes. Although it has been proposed to install various forms of measuring devices to be used by the customer to determine the proper shoe size, such devices have not found any significant use in the sale of shoes because they are too complicated to be used by the customer and, except for the hand operable devices commonly used by salesmen are unreliable.

There has thus been a great need for a reliable foot measuring device which is extremely easy to use by the customer, such as one which requires the customer merely to place his feet on the device and wherein the proper shoe length and width classification is automatically displayed on an indicating panel. The design of an automatic shoe indicating apparatus meeting these requirements is indeed a substantial undertaking when the various factors involved in the design thereof are taken into account.

One of the requirements for a practical automatic shoe size indicating device is that it should be useful with feet of practically all shapes and configurations having lengths and widths falling within a given range. One common approach in prior attempts to design a practical device has been to place photocells or foot switches in the horizontal wall of a foot-receiving stand. The number of the switches actuated or the photocells covered provide an indication of foot length and width. One of the problems in such a device is that the various photocells and mechanical switches must be positioned on the footstand in places where the normal foot would be longest and widest for the various foot lengths and widths involved. Unfortunately, there is, however, a large variation in a substantial percentage of the population of the location of the longest and widest parts of their feet and so a device designed for a "normal foot," is, in fact, inaccurate in a significant percentage of the feet measured thereby.

Another factor which increases the complexity of the design of a practical and reliable automatic shoe size indicating apparatus is that the proper shoe length classification is not necessarily determined by the actual length of the user's foot. In some cases, a greater shoe length than is indicated by foot length is necessary due to an unusually long heel to ball length of the foot.

A still further complicating factor is that the shoe width classification required by given foot is determined not only by the actual foot width, but also by the foot length involved. Thus, each of the commonly used foot width classifications AAAA, AAA, AA, A, B, C, D, E, etc. does not indicate a fixed shoe width. For example, the shoe width classification B, represents a wider shoe (and foot) width for a length size 10 than it does for a length size 8. A larger number of combinations of foot lengths and width sizes must thus be interrelated by the equipment involved which greatly increases the expense and complexity of the equipment.

The preferred form of the present invention provides an automatic shoe size indicating device which takes into account all the above mentioned factors and gives an accurate indication of shoe size for feet of any shape, for the standard ranges of shoe length and shoe width. Thus, in accordance with one aspect of the present invention, the shoe size indicating device is provided with foot length, heel to ball length and foot width sensing elements which respond to variations in these dimensions as viewed from the vertical profile of the foot rather than the horizontal profile thereof. In the most proferred form of the invention, foot length is measured by directing light beams parallel to and along the top of a foot-receiving platform in the direction of the width of an elongated foot-receiving area thereon and providing longitudinally spaced photocells for intercepting the light beams. The extent of the light which is interrupted by the user's foot placed on the platform is a measure of the actual foot length. With this arrangement of the photocells, it makes no difference whether the longest part of a foot of given overall length is the big toe or a little toe since the same light beam is intercepted in either case.

Foot width measurement is achieved in a similar way. Thus, a number of light beams are directed parallel to and along the top of the foot-receiving area of the platform along the length thereof. These beams are intercepted by photocells spaced laterally in the direction of the width of the foot-receiving area. Here again, it makes no difference where the widest point of the foot is located because the same light beam will be intercepted by a foot of given width no matter where the widest point of the foot is located.

In accordance with another aspect of the invention, where it is desired to determine foot length at least in part by the distance between the heel and ball of the foot, the position of the ball of the foot is determined by sensing switches at the side of the foot-receiving area of the platform. One of the switches is engaged and actuated by the projecting bone on the inside of the foot involved wherein the heel to ball length of the foot is determined by the location of the actuated switch. The switches are provided with stiff foot engaging arms, so that usually only one switch is actuated by pressure applied by the furtherest projecting part of the bone referred to, the contact of a switch with a more fleshy projecting part of the foot being inoperative to actuate the switch.

In a case where the desired shoe length is to be determined by the longest of the shoe sizes called for by the total foot length and the heel to ball length, the present invention provides a simple circuit which automatically selects and displays the longest of the shoe sizes involved.

In still another aspect of the invention, the shoe size indicating device automatically indicates to the customer whether his foot requires an especially wide or an especially narrow width which the machine is not designed to accommodate. In the preferred form of the invention this is accomplished along with the indication of the shoe width classification called for by the particular combination of foot length and foot width involved in an uniquely simple manner which takes advantage of the fact that the minimum shoe width classification (AAAA) for the various foot lengths are used for foot widths which progressively increase with foot length. In the preferred form of the invention, the outputs of the various foot length and foot width sensing means are scanned in synchronism and in a definite order so that the output of a width sensing means representing a given foot width is scanned with the length sensing means for which the foot width involved requires the minimum shoe width classification. In the case where the foot length and width sensing means are photocells positioned as described above the photocell outputs are preferably scanned in the order of the progressively increasing foot lengths or foot widths which they represent, a foot length of the foot being measured is determined by identifying the first length photocell scanned which receives light and the foot width of the foot being measured is determined by identifying the first width photocell which receives light. If a width photocell receiving light is scanned before a length photocell is scanned receiving light, the user is given a visual signal which indicates that the user's foot requires a special narrow shoe width classification.

If a length photocell receiving light is scanned before a width photocell receiving light is scanned the foot being measured requires a shoe width classification greater than the minimum width (AAAA) classification. A shoe width counter is provided whose operation is inhibited until a foot length photocell is scanned which receives light. The shoe width counter then counts one unit for each subsequent foot width photocell scanned until a width photocell is scanned which receives light whereupon the count in the counter is held. The count then in the counter indicates the actual shoe width classification required for the foot involved. Thus counts of 0, 1, 2, 3, etc. require shoe width classifications AAAA, AAA, AA, A, etc. The shoe width counter can accommodate and count one unit higher than the number of shoe width classifications involved. If the count in the shoe width counter reaches this additional count, this indicates that the user requires a special wide shoe width classification and a visual indication to this effect is given the customer.

The present invention has other important features to be described which further enhance the simplicity of operation and the reliability of the shoe size indicating apparatus of the invention. These and other objects and advantages of the invention will be apparent upon making reference to the specification to follow, the claims and the drawings wherein:

FIG. 1 is a perspective view of an exemplary shoe size indicating apparatus incorporating features of the present invention;

FIG. 2 is an enlarged plan view of the apparatus shown in FIG. 1;

FIG. 3 is a further enlarged view in vertical section through the base of the apparatus shown in FIGS. 1 and 2, taken substantially along the line 3—3 in FIG. 2;

FIG. 4 is a further enlarged view in vertical section through the base of the apparatus shown in FIGS. 1 and 2, taken substantially along the line 4—4 in FIG. 2;

FIG. 5 is a fragmentary view in horizontal section through the base of the apparatus shown in FIGS. 1 through 4, taken substantially along the line 5—5 in FIG. 4;

FIG. 6 is a basic block diagram of a logic circuit of the preferred form of the invention which responds to the positioning of the foot on the base of the apparatus shown in FIGS. 1 through 5 by displaying the proper shoe length and shoe width classifications for the foot being measured;

FIG. 7 is a chart illustrating the various shoe length and width classifications for various foot length and width measurements indicated by the count stored in various counters illustrated in FIG. 6; and FIGS. 8 and 9 are circuit diagrams of portions of the circuit of FIG. 7.

Referring now more particularly to FIGS. 1 through 5, the shoe size indicating apparatus of the present invention which is therein illustrated includes a base or footstand 2 which rests on the floor and forms among other things, a housing for various of the electrical components which respond to the placement of a foot to be measured on a foot receiving platform 4 thereon. A pedestal 5 extends upwardly at the rear of the base 2 and supports at the top thereof a display panel 7 upon which the shoe width and length classifications for the foot being measured is displayed. The platform 4 is located a short distance below the upper surface 2a of the base 2 and as illustrated has an elongated rectangular shape. A pair of longitudinal foot positioning walls 6–6', referred to as the left and right longitudinal walls, extend upwardly from the opposite longituidnal margins of the platform. A heel abutment wall 8 extends upwardly from the front of the platform and an end wall 8' extends upwardly from the rear of the platform. As shown most clearly in FIG. 2 in using the apparatus only one foot is placed on the platform at a time. The right foot is placed against the left longitudinal wall 6 with the heel of the foot resting against the heel abutment wall 8, and the left foot is placed against the right longitudinal wall 6' with the heel resting against the heel abutment wall 8.

A depressible heel switch operating pin 10 projects from the heel abutment wall 8 adjacent the left hand end thereof to be depressed by the heel of the right foot when positioned against the heel abutment wall 8, and a similar depressible heel switch operating pin 10' projects from the heel abutment wall 8 adjacent the right hand thereof to be depressed by the heel of the left foot positioned against the heel abutment wall 8. A depressible ball switch operating bar 12 projects from the right longitudinal wall 6 to be depressed by the ball of the left foot placed against the wall 6'. When a heel switch operating pin 10 or 10' and the associated operating bar 12 or 12' are simultaneously depressed by the placement of a foot on the platform 4, a measurement operation to be described, is automatically initiated. The required simultaneous operation of the pins 10 or 10' and bar 12 or 12' will prevent operation of the apparatus unless the user's foot is properly positioned on the platform 4.

Projecting beyond the left and right longitudinal walls 6 and 6' are respective groups 14 and 14' of individual ball sensing switch operating pins. The various switch operating pins in each of the groups 14 and 14' are spaced from the heel abutment wall 8 at various distances corresponding to the various heel to ball lengths requiring the half size changes in the shoe length classifications. The various pins would be spaced approximately ⅙ of an inch apart in the currently used shoe length classifications in the United States. There are 44 ball sending switch operating pins in each of the groups of pins 14 to 14'. Each of the pins operates a separate switch 14a or 14a' shown in FIG. 4, each including a relatively stiff spring (not shown) opposing the easy depression of the pins to a switch operating position, so that they will be depressed to such a position only when the solid force of the ball joint bone which projects from the inside of the foot is applied thereto.

Engagement of one of these pins with the fleshy part of the foot on either side of the furthest projecting point of the ball point bone will not depress the same a sufficient distance to reach a switch operating position. The particular pin which is depressed to this position indicates the heel to ball distance of the foot involved.

The apparatus described in this application is one which will display the longest shoe size required by the actual foot length and the heel to ball length of the foot involved. The actual foot length of the foot being measured is determined by means including a series of longitudinally spaced photocells 18 mounted within the base 2 at a point spaced from the left longitudinal wall 6 as best shown in FIG. 4. The wall 6 has at the bottom thereof a light transmitting slot 20 in alignment with the photocells 18, through which slot light focused parallel to the platform 4 can pass and strike the photocells. The photocells 18 are spaced a sufficient distance from the light transmitting slot 20 that the photocells 18 are shaded from light beams originating externally of the apparatus which is directed at an angle to the platform 4. The photocells 18 are spaced apart a distance (⅙ of an inch) representing the change in the half sizes of the shoe length classifications involved. In the example of the invention being illustrated where there are 22 full sizes encompassing the children's and adult shoe sizes, there will be 44 photocells representing the 44 half sizes involved.

Light is directed across the width of and parallel to the platform 4 where the light passes through slot 20 and strikes the photocells 18 in the absence of a foot on the platform 4 by means including one or more light sources 22 mounted within the base 2. The light from the light sources 22 is focused by a series of lenses 24 into parallel beams which pass through a slot 20' at the bottom of the right longitudinal wall 6' having the same length as slot 20 in the left longitudinal wall 6. When either a right or left foot is placed adjacent the left or right longitudinal wall 6 or 6', the light which strikes the photocells 18 will be interrupted to an extent depending upon the length of the foot involved. Thus, the number of photocell outputs of the photocells 18 indicating interruption of light will be an indication of the length of the foot involved.

Foot width is determined in a manner similar to foot length. Thus, a series of photocells 23 are mounted within the base 2 at a point spaced from the rear end wall 8'. As illustrated in FIG. 7, for the 22 full size shoe length classifications, there are 30 foot widths represented by numbers 0 to 29 which in association with the various foot lengths requiring full size changes in the shoe length classifications call for nine different shoe width classifications. Thirty photocells are provided to measure the thirty different foot widths involved. The minimum shoe width classification AAAA is utilized with progressively increasing foot widths represented by the numbers 0 to 21 respectively for the childrens' full length sizes 5 through 13 and the adult full length sizes 1 through 13. For a given shoe length classification progressively increasing shoe width classifications AAA, AA, A, B, C, D, E, EE are assigned to foot widths which progressively increase in width from the minimum foot width for the length involved.

The thirty width photocells 23 are centered with respect to the width of the platform 4. When the right foot is being measured, the furthest photocell to the left as viewed in FIG. 5, is the No. 0 photocell and the photocell furthest to the right is the No. 29 photocell. When the left foot is being measured, the photocell furthest to the right is the No. 0 photocell and the photocell furthest to the left is the No. 29 photocell.

The photocells 23 are in horizontal alignment with a slot 25' formed in the bottom of the end wall 8' which slot passes longitudinal light beams extending parallel and contiguous to the platform 4. The photocells 23 are spaced a sufficient distance from the end wall 8' that they are shaded from any direct light beams originating externally of the apparatus which may pass through the slot 25' at an angle to the platform 4. Means are provided for directing light longitudinally over the platform 4 which passes through the slot 25' to strike the photocells 23 in the absence of a foot positioned on the platform 4. These means include one or more light sources 27 mounted within the base 2 and lenses 29 which focus the light therefrom through a slot 25 formed at the bottom of the heel abutment wall 8 where it passes parallel and adjacent the platform. When a foot is positioned against the heel abutment wall 8, the light will be interrupted to an extent which is a function of the width of the foot involved. The number of photocells 23 which have their light beams interrupted will, therefore, be a measure of the width of the foot being measured.

When the right foot is being measured, a light switch 24 mounted on the pedestal 5 is moved to a position indicating that the right foot is being measured and, when the left foot is being measured, switch 24 is moved to a position indicating that the left foot is being measured. The switch 24 determines whether the left hand or the right hand photocell of the group of photocells 23 is the No. 0 photocell for determining the foot width. As will appear, the actual foot length or foot width involved is determined by a scanning technique which scans the outputs of the length and width photocells 18 and 23 in progressive order from the photocells representing the shortest length and width to the photocells representing the longest length and width. The first photocell outputs scanned of the groups of photocells 18 and 23 indicates the length and width of the foot involved.

As previously indicated, the shoe width classifications for the various foot lengths involved are indicated by a technique including the synchronization of the scanning of the length and width photocells. To this end, as a particular length photocell is scanned, the width photocell is scanned for the foot width requiring the minimum shoe width classification for the length involved. Thus, assuming that the length photocell representing the adult length 7 is scanned at a given instant, the width photocell is scanned representing the minimum width for that length, namely photocell No. 15, (see FIG. 7). If at that instant the width photocell No. 15 is the first width photocell to receive light, and the photocell for the adult length 7 is the first length photocell to receive light, this indicates that a minimum shoe width classification AAAA is required for the foot being measured. If when the first length photocell is scanned receiving light, the width photocell scanned is still receiving no light, a count is kept of the number of photocells thereafter scanned until the first width photocell receiving light is scanned. This count indicates the particular shoe width classification involved. Thus, if four photocells are scanned after width photocell No. 15, for an adult foot length 7, this indicates a shoe width classification B (FIG. 7). On the other hand, if in this example all nine width photocells No. 16–24 are scanned after photocell No. 15 without detection of a photocell receiving light, the apparatus indicates on the display panel 7 that an especially wide shoe classification is required which is not indicated by the apparatus. On the other hand, if a width photocell 23 is scanned receiving light before a length photocell receiving light, this indicates an especially narrow shoe width classification which is not indicated on the apparatus.

As will appear, the electrical circuitry utilized in the present form of the invention is designed so that the scanning of the various length and width photocells 18 and 23 will not proceed until light sources 22 and 27 are fully energized. To this end, the scanning of the photocells is delayed a fixed amount after initial depression of the heel contacting switch operating pin 10 or 10' and the ball contacting switch operating bar 12 or 12'.

Refer now to FIG. 6 which shows a basic block diagram illustrating a preferred circuit which responds to the outputs of the various photocell devices and the operation of the various switches controlled by the placement of a foot upon the platform 4. FIG. 6 shows in diagrammatic form the base 2 with a left foot placed against the right longitudinal wall to depress the heel switch operating pin 10' and the ball switch operating bar 12'. On depression of the pin 10' and the bar 12', switches 10a' and 12a' are operated to provide a control voltage at the terminal F', which, in the example illustrated, is ground voltage, and triggers a (one-shot) monostable multivibrator D or other suitable delay means into operation for a short period. As illustrated, the monostable multivibrator D has two stages D1 and D2 having output terminals D1' and D2' which are respectively normally (i.e. in the reset state thereof) at ground and a negative potential represented by the symbols (0) and (—). (It should be understood that the particular ground and negative potentials referred to are exemplary voltages only, and the specific exemplary form of the invention now being described encompasses similar or equivalent logic circuits utilizing other reference voltages.)

When the monostable multivibrator is triggered into operation, terminals D1' and D2' momentarily reverse their potentials, to provide ground or zero potential at the terminal D2' and a negative potential, at the terminal D1'. Terminal D2' is a reset output terminal which resets various portions of the circuit to be described when the voltage thereat changes from its normal negative value to ground. The terminal D1' sets various parts of the circuit when the voltage thereon returns to ground upon reset of the monostable multivibrator. The terminal D1' is connected to one of the inputs of what is indicated as a NOR gate N1. The gate N1 has two other inputs respectively extending to an output L2' of a bistable unit L, which is normally at ground potential and an output terminal W2' of a bistable unit W which is normally at ground potential. The NOR gate N1, and other similar NOR gate circuits to be described, will be assumed to operate on the principle that all of the inputs must be at ground potential to provide a binary output which, unless otherwise stated, will be assumed to be a negative (—) potential, and in all other cases will have a binary output O which will be assumed to be a ground potential. It is thus apparent that when the delay circuit D is momentarily triggered into operation, the resulting negative potential appearing at the output terminal D1' will provide a grounded output at the NOR gate N1. The grounding of the latter output will effect energization of photoelectric cell light sources 22 and 27 connected between the output of NOR gate N1 and a source of negative potential as indicated.

When the monostable multivibrator D becomes reset and its output terminal D1' returns to ground, the resultant positive going voltage at the terminal D1' will be effective to set the bistable unit L which, in a manner to be explained, initiates scanning of the outputs of the length photocells 18. (A differentiating capacitor 51 is coupled between the output terminal D1' of the delay circuit D and the bistable unit L so that only changes in the voltages at the terminal D1' are coupled to the bistable unit L.)

When the bistable unit L is set, the potential changes at an output terminal L1' thereof from a negative to ground potential and at an output terminal L2' thereof from ground potential to a negative potential. The output terminal L1' is connected to one of two inputs of a NOR gate N2, the other input of which extends to the output of a pulse source C having an output terminal C' whose potential alternates between ground and a negative potential. The output of the NOR gate N2 will alternate between ground and a negative potential in synchronism with the pulses at the output terminal C' whenever the input thereof extending to the output terminal L1' is at ground potential, namely when the bistable unit L is set. When the bistable circuit L is reset, the presence of the negative potential at the output terminal L1' thereof will prevent the coupling of the pulses at the input to the output of the NOR gate N2.

The output of the NOR gate N2 is coupled through a capacitor 53 to the input of a length counter 55 which advances one count each time it receives a pulse of proper polarity through the coupling capacitor 53. The length counter 55 is reset to a zero count upon the setting of the monostable multivibrator D. This is effected through one or more reset inputs 55a coupled to the terminal D1' of the monostable multivibrator D.

The length counter 55, as shown in FIG. 8, can be a conventional binary pulse counter having a number of stages 55–1, 55–2, 55–4, 55–8 etc., each representing a different binary digit. The outputs of these stages extend to a binary to decimal converter matrix 58 which has normally negative output lines 58–1, 58–2 . . . 58–43 respectively associated with the length photocell 18–0, 18–1 . . . 58–43. As the length counter 55 advances one count, a different one of these matrix output lines becomes grounded.

Each of the various output lines of the matrix 58 extends to an individual inverter amplifier collectively identified in FIG. 6 by reference numeral 60 and individually identified in FIG. 7 by reference numeral 60–0, 60–1, 60–2 etc. As the various output lines of the matrix 58 change from negative to a ground potential, the various outputs of the inverter amplifiers 60 become negative at the same time. The outputs of the inverter amplifiers 60 effectively control the sequential scanning of the various length photocells.

The inverter amplifiers are each connected to a multiple function circuit generally indicated by reference numeral 61 in FIG. 7. Each of these functions is indicated by an individual block to simplify an understanding of the circuit of FIG. 6 although the elements carrying out the function are in many instances common to some of the blocks shown in FIG. 6. Thus, as shown in FIG. 6, the various outputs 62–0 through 62–43 of the inverter amplifiers 60 extend to respective inputs of two input "and" gates 61a, the other inputs of which are coupled to the outputs of the various length photocells through, for example, a longest size select circuit 63 and photocell amplifiers 64. In the case where the heel to ball length does not require any longer shoe size than the actual heel to toe length of the foot being measured, the outputs of the longest size select circuit 3 are all respectively connected to the outputs of photocell amplifiers 64–0 through 64–43 connected respectively to the photocells, 18–0 through 18–43 (FIG. 8).

When light strikes a given length photocell, the output of the associated amplifier 64 will be at ground potential, and, when the light is interrupted by the user's foot, the output of the associated amplifier 64 will be at negative potential. The various inputs of the AND gates 61a–0, 60a–1, etc. connected to the inverter amplifier 60 receive a negative voltage progressively in accordance with the foot length assigned to the associated photocell. Thus, the AND gate 61a–0 associated with the length photocell 18–0 will receive a negative gating voltage from the associated amplifier 60 before the AND gates 61a–1, 61a–2, etc. respectively associated with the length photocells 80–1, 80–2, etc. As soon as an AND gate 61a receives a negative voltage from the associated inverter amplifier 60 and from the longest size select circuit 62, a pulse will appear at the output of that particular AND gate which is connected through an OR connection or circuit 61b to the reset input of the bistable unit L to reset the same and thereby terminate the pulsing of the length counter 55. When the particular heel to ball length indicates a longer size than is indicated by the actual heel to toe length of the foot involved, the output of the longest size select circuit 63 is modified in a way to be explained so that the proper AND gate 61a receives a negative voltage from the output of the circuit 63 which indicates the proper shoe length.

When the length counter 55 has stopped counting, the count therein will be an indication of the actual shoe length required for the foot involved. Individual length display bulbs 70–0, 70–1 . . . 70–43 are mounted behind numbered nameplate sections of the display panel 7 on top of the pedestal 5 (see FIG. 1) for each half size involved. The bulbs 70 are connected respectively to the outputs of AND gates 61c–0 through 61c–43 (FIG. 8) collectively indicated by 61c in FIG. 6 and controlled by input connections thereof leading to the inverter amplifier 60 and a NOR gate controlled follower 67 (FIG. 9). Thus, when the length counter stops, and other portions of the circuit to be described have completed their operation, the AND gate 61c associated with the output 62 of the inverter amplifier having a negative voltage will open or operate to energize the associated light bulb 70. In the particular exemplary circuit shown in FIG. 8, a particular bulb 70 will be energized whenever the input of the AND gate 61c extending to the associated amplifier output 62 is negative while the input extending from the associated follower 67 is also negative.

The output of the follower 67 will be negative provided the output of a NOR gate N3 connected to the input thereof has a negative output potential. The NOR gate circuit N3 has four inputs all of which must be at ground potential to obtain the negative output referred to. One of these inputs extends to the terminal F′ which is grounded upon closure of the heel switch 10a′ and the ball switch 14a′. Another input extends to the output terminal D1′ of the monostable multivibrator delay circuit D which is at ground potential except during the delay a third input to NOR gate N3 extends to the output terminal L2 of bistable unit L which is at ground potential only after the bistable unit is reset, that is, when the count in the length counter 55 has been stabilized. The fourth input to the NOR gate N3 extends to the output terminal W2′ of a bistable unit W, which is at ground potential after the foot width has been measured in a manner to be explained. Thus, a length display bulb will not be lit until the operation of the entire circuit has been completed, namely when both the foot length and foot width involved have been detected by the circuitry now being described. More importantly, when the user removes his foot from the platform, the count which will be stored in the length counter until the operation of the monostable multivibrator D by the subsequent placement of a foot on the platform 4 will have no effect on the length (or width) display lamps since removal of the user's foot from the platform 4 will remove ground from terminal F′ and de-energize all lamps.

Foot width is determined by means similar to the circuit just described for determining foot lengths. Thus, a width counter 71 is provided which advances one count each time the output of a different width photocell 23 is scanned. As previously indicated, the length and width photocells are scanned in synchronism but the width photocells are scanned at half the rate of the length photocells because each width photocell represents a foot width which calls for a shoe width classification change only at the full size length classifications, as indicated in FIG. 7.

The feeding of pulses to the width master counter 71 is under control of the NOR gate N4 which operates on a similar principle of the operation to the NOR gate N2. The NOR gate N4 accordingly has one input extending to the output C′ of the pulse source C and a second input extending to the output terminal W1′ of width bistable unit W. The width bistable unit W has an input connected through a capacitor 73 to the output terminal D1′ of the monostable multivibrator D. The resetting of the monostable multivibrator D results in the coupling of a reset pulse to set input terminal of the bistable unit W. The output terminal W1′, which is normally negative, then becomes grounded which results in the appearance of pulses at the output of the "NOR" gate N4. These pulses are coupled through a coupling capacitor 75 to the input of a divide by 2 unit 77. The divide by 2 unit 77 as well as the individual stages of the counters 55 and 71 comprise individual bistable units as illustrated in FIG. 9 which are reset by their connection through coupling capacitors to the reset output terminal D2′ of the monostable multivibrator D.

The various stages of the width counter 71 are connected to a binary to decimal converter matrix 82 which is similar to the matrix 58. The matrix 82 thus has a number of output lines 82-0 through 82-29 corresponding to the number (30) of width photocells. As in the case of the matrix 58, the matrix 82 provides a ground potential on only the output line corresponding to the count in the width master counter 71 at a given instant. This count will continue to increase until the output of a width photocell is scanned indicating the reception of light by that photocell in a manner to be explained. Each of the outputs of the matrix 82-0 to 82-29 is connected to an individual inverter amplifier all of which are collectively identified in FIG. 6 by reference numeral 84. The individual amplifiers are identified by reference numerals 84-0 through 84-29, in FIG. 9.

The inverter amplifier 84 connected to the output line of the matrix 82 which is grounded at any instant provide a negative potential at this instant for preparing an associated AND gate 85a of a group of AND gates 85a-0 through 85a-29 for passage of a reset signal to the width bistable unit W if the associated input line receives a negative potential from the output of the associated amplifier 87 controlled by one of the width photocells 23. The latter amplifiers associated with the width photocells 23 are individually identified by reference numerals 87-0 ... 87-29 in FIG. 9. Thus, as the count in the width counter 71 progressively advances, a negative potential will progressively appear at the various output lines 84-0 thru 84-29 of the inverter amplifiers 84 so that the outputs of the width photocells are effectively scanned from the width photocell associated with the narrowest foot width to the width photocell associated with the widest foot width. The output of a foot width amplifier 87 which is associated with a width photocell receiving light providing a negative potential to the associated AND gate 85a will, when that particular AND gate 85a receives a negative potential from the output of the associated inverter amplifier 84, effect the transmission of a reset signal through an OR circuit 85b to the reset input of the width bistable unit which through the connection of output terminal W1′ to the input of gates N4 will stop the feeding of pulses to the width counter 71.

In the case where all of the width photocells are covered by the foot being measured, in the absence of an auxiliary means for resetting the bistable unit W, the width counter 71 would continue to operate through repetitive cycles and the NOR gate N4, due to the connection of one of its inputs to the output terminals W2′, would not permit any of the bulbs 70 or 98 to be energized. Therefore, auxiliary means are provided for resetting the bistable unit W in the event that the light is interrupted to all of the width photocells. This auxiliary means may include a line 86 associated with the same inverter amplifier as the output line 85-29, which line 86 has a negative potential when the width counter 71 has a count of 29 therein and returns to ground when the width counter 71 is advanced to its thirtieth count or is reset. Thus, as the thirtieth pulse is fed to the width counter 71, the potential on line 86 will change from a negative to a ground potential. This positive going voltage is fed to a differentiating network 88 which produces a positive pulse which is coupled through a rectifier 89 to the reset input of the bistable unit W.

The output terminal W1′ of bistable W is connected to a NOR gate N5 which controls the feeding of pulses from the pulse source C to a slave counter 91. The slave counter 91 does not start counting until a length photocell is scanned which receives light, indicating the completion of a foot length measurement. Thereafter, the slave counter 91 will advance in synchronism with the width counter 71. To this end, the NOR gate N5 has a number of additional inputs, one of which extends to the output terminal C′ of the pulse source C, another of which extends to the output terminal L2′ of the length bistable unit L which has ground potential only when the bistable unit L has been reset, and another of which extends to an output terminal S9 of an inverter amplifier 93 associated with the slave counter. The feeding of pulses to the slave counter 91 through NOR gate N5 will cease upon reset of the width bistable unit W if the slave counter 91 has not been previously stopped by a signal from the terminal S9. The slave counter is capable of counting from 0 through 9 and a count held therein from zero through 8 represents respectively the various shoe width classifications from AAAA to EE. When the slave counter 91 reaches the ninth count, a negative potential will appear at the output terminal S9 which will effectively close the NOR gate N5 to stop the feeding of the pulses from the pulse source C. A ninth count in the slave counter indicates a special wide shoe classification.

The slave counter 91, which may be a conventional binary pulse counter, as the other counters 55 and 77, has individual stages indicated by reference numerals 91–1 through 91–8 in FIG. 9. The binary outputs of the slave counter 91 are connected to a binary to decimal converter matrix 94 which is similar to the matrixes 58 and 82 previously described. The matrix 94 has ten output lines identified by reference numerals 94–0 through 94–9 which are respectively connected to individual inverter amplifiers collectively shown in FIG. 6 by reference numeral 93 and individually shown in FIG. 9 by reference numerals 93–0, 93–1 . . . 93–9. The output lines 94–0 to 94–9 sequentially have ground potential applied thereto as the slave counter advances its count from 0 through 9. The output of each inverter amplifier 93 changes from ground to negative as the associated matrix output line changes to ground potential.

Each of the outputs of the inverter amplifiers 93 extends to one of a pair of inputs of an individual AND gate collectively identified by reference numeral 96 and individually identified in FIG. 9 by reference numerals 96–0, 96–1 . . . 96–9. Each of the gates 96 has another input extending to the terminal "A" of the follower 67. Each of the gates 96 controls a bulb 98 mounted behind the display panel 7 indicating the width classifications between AAAA and EE and, in addition, a special category entitled "Special Wide." The bulbs 98 are individually identified in FIG. 9 by reference numbers 98–0, 98–1 . . . 98–9. When a gate 96 receives a negative potential both from the output of the associated inverter amplifier 93 and follower 67, the associated bulb 98 will be energized to indicate the proper shoe width classification or, in the case of a special wide situation, the fact that an especially wide shoe classification is required for the foot being measured.

As previously indicated, if the output of a width photocell 23 is scanned which indicates the reception of light before the output of a length photocell 18 is scanned indicating the reception of light, the customer involved requires a special narrow shoe classification. This fact is indicated on a special narrow bulb 100 mounted behind the panel 7. This bulb 100 is connected to the output of a bistable 102 which has a set state where the bulb 100 is energized and a reset state where the bulb is de-energized. The bistable 102 is reset in the same manner and at the same time that the other parts of the circuit are reset by connection of a reset input thereof through a differentiating capacitor 104 to the output terminal D2′ of the monostable multivibrator D. The bistable 102 is set by means including a NOR gate N6 having a number of inputs to be described, all of which must be at ground potential to effect the generation of a synchronizing pulse which is fed to the bistable 102 to reset the same. As in the case of the other NOR gate circuits, the output of the exemplary NOR gate N6 will be at a negative potential when all of the inputs thereof are at ground potential. A differentiating network 106 and a rectifier 108 are provided which will feed a negative setting pulse to the bistable 102 whenever the output of the NOR gate N6 changes from ground to a negative potential.

The NOR gate N6 has four inputs, one of which extends to the terminal F′ which is grounded when the heel and ball switches 10a′ and 12a′ are closed, another of which extends to the output terminal D1 of the delay circuit D which is at ground potential when the delay circuit is in a reset state, another of which extends to the output terminal L1′ of the bistable L which is at ground potential when the length counter 55 continues to receive pulses from the pulse source C, and another of which extends to the output terminal W2′ of the bistable W which has ground potential when the bistable W is reset due to the scanning of a width photocell which receives light. It is apparent that the logic of the NOR gate circuit N6 is such that the bistable 102 will be set to light the special narrow bulb 100 only when a foot has been placed on the platform 4, the delay period referred to has terminated, and a width photocell is scanned receiving light before a length photocell is scanned receiving light.

The specific exemplary circuitry illustrated in FIGS. 8 and 9 is, for most part, self-explanatory and so a detailed description of many portions thereof will not now be given. This applies, for example, to the various counters, matrices and amplifiers already identified.

Referring now to FIG. 8, each of the various length photocells 18 is connected between the base electrode and ground of a PNP transistor 110, whose emitter electrode is grounded and collector electrode is connected through a resistor 112 to a source of negative potential. The base electrode thereof is also connected through a resisistor 114 to the source of negative potential. When the photocell is dark, the impedance thereof will be very high which will place a negative potential on the base electrode of the transistor to render the same highly conductive. The output of the transistor is taken at the collector electrode thereof which will then be substantially at ground potential. When light strikes the photocell in any substantial magnitude, the impedance of the photocell will be very low, thereby effectively grounding the base electrode of the associated transistor which renders the same non-conductive. The collector electrode of the transistor 110 will then be highly negative.

The collector electrode of each of the transistors 110 is connected to one of the levels 24a of a wafer switch assembly, each level 24a of which constitutes a single pole, double throw switch having stationary contacts No. 1 and No. 2. The wafer switch assembly is operated by the knob 24 at the top of the pedestal 5 (FIG. 1) which knob is adjusted to indicate whether the right or the left foot is being measured. When the left foot is being measured, the wiper of each of the switch levels 24a is on the No. 1 contact, and, when the right foot is being measured, the wiper is on the No. 2 contact. The No. 1 contact of each of the switch levels 24a is connected to the wiper of one of the ball switches 14a′ operated by one of the pins 14′ projecting from the right longitudinal wall 6′ adjacent the platform 4. The No. 2 contact of each switch level 24a is connected to the wiper of one of the ball switches 14a operated by one of the pins 14 projecting from the left longitudinal wall 6 adjacent the platform 4. The No. 1 contact of each ball switch 14a′ is connected to the No. 1 contact of a switch level 24b of the wafer switch assembly and the No. 1 contact of each ball switch 14a is connected to the No. 2 contact of the associated switch level 24b. The No. 2 contacts of the ball switches 14a and 14a′ are grounded. Each of the wipers of the various switch levels 24b is connected to a terminal 120 of a multi-function AND-OR circuit 61.

When the wafer switch assembly is operated to select a left foot measurement, the outputs of each of the photocell amplifiers 64 is normally connected through the associated left foot ball switch 14a′ to the terminal 120, and when the wafer switch assembly is moved to its right foot select position, the output of each of the photocell amplifiers 64 is normally connected through the right foot ball switch 14a to the terminal 120. These connections to the terminal 120, however, are interrupted for the photocell circuit having a ball switch 14a or 14a′ which is operated by the ball joint. When the ball joint of the left foot being measured depresses one of the ball contacting pins 14′, the wiper of the associated switch 14a′ will be depressed to a position where it engages the grounded No. 2 contact thereof. Similarly, the ball joint of the right foot being measured will strike one of the pins 14 to move the wiper of the associated ball switch 14a to a point where it contacts the grounded No. 2 contact thereof. The purpose of the various levels 24a is obviously to select whether the ball switches 14a or the ball switches 14a' are operative in the circuit now being described.

If the actual heel to toe length of the foot being measured requires a smaller size than the heel to ball length of the foot involved, then the photocell of the ball switch 14a or 14a' which is operated by the ball joint involved, as well as at least the preceding photocell associated with the circuit for the next smallest half size, will be receiving light, and so the associated photocells will be in a non-conductive condition providing a normally negative voltage at the collector electrodes of the associated transistors 110.

In the absence of the operation of the ball switches 14a or 14a' referred to, the scanning operation for a length photocell output would stop at the latter photocell rather than the former photocell associated with the operated ball switch. The select circuit to be described in this instance will, however, feed a ground voltage to the terminal 120 associated with the smaller shoe length size involved, so that the circuitry connected to the terminal 120 will react as if the associated photocell was still in the dark. However, the terminal 120 associated with the circuit with the operated ball switch will as above indicated, be at a negative potential due to the connection of the terminal 120 through a resistor 121 to a source of negative voltage.

The wipers of the ball switches 14a and 14a' associated with a particular photocell 18 are connected together by a jumper 118 to cooperate with the select circuit 62 now to be described. A conductor 122 extends from each of the terminals 120 through a rectifier 124 connected to pass a positive going potential to the terminal 120. Each rectifier 124 is connected to the commonly connected wipers of the ball switches 14a and 14a' associated with the photocell circuit of the next largest shoe size. Thus, the terminal 120 associated, for example, with shoe length size 6 is connected by a conductor 122 and a rectifier 124 to the wipers of the ball switches 14a and 14a' associated with the shoe length 6½. Assuming, for example, that the first length photocell receiving light is photocall 18–2, indicating normally a shoe length size of 6, if the ball switch 14a or 14a' associated with the shoe length size 6½ were to be operated, the movement of the associated wiper to the grounded No. 2 contact will connect ground potential through the rectifier 124 and the conductor 122 associated with the circuit with the operative ball switch to the terminal 120 of the circuit associated with the shoe length size 6 which would otherwise be at a negative potential. The scanning operation previously described will therefore stop at the point where the scanning circuit is associated with the shoe length size 6½ rather than 6, since the voltage at the terminal 120 associated with shoe length 6 has ground potential which would appear to indicate that the associated photocell 18–1 is still in the dark.

The AND-OR circuit 61 associated with each length size includes a capacitor 130 connected between the associated terminal 120 and one end of a resistor 132 whose opposite end is grounded. A rectifier 134 arranged to pass a positive going potential is connected between the ungrounded end of resistor 132 and a common line 136 to which all the rectifiers 134 associated with the various shoe length size circuits are connected. The common conductor 136 extends to the base electrode of a transistor 137 forming part of the bistable L, and when a positive going potential appears on the common conductor 136 the bistable L is set.

A conductor 138 extends between each of the terminals 120 and a rectifier 139 arranges to couple a positive going (ground) voltage to the terminal 120. The rectifier is connected to the collector electrode of any transistor 140 forming part of the gate circuit 61c forming part of the AND-OR circuit 61. The emitter electrode of each transistor 140 is grounded. The collector electrode of each transistor is thus connected to a source of negative potential through rectifier 139, conductor 138, terminal 120 and the associated resistor 121. When a terminal 120 is grounded, obviously the associated transistor 140 will not receive energizing potential to render the same conductive. Thus this ground condition at the terminal 120 exists when the associated length photocell is in the dark or appears to be in the dark. When, however, the photocell is in light, or as previously indicated, the collector electrode at the associated photocell amplifier 64 will be non-conductive and so will result in the presence of a negative potential at the terminal 120.

The capacitor 130 of each AND-OR circuit 61 will have a charge thereon (a negative potential on its left plate and ground potential on its right plate as viewed in FIG. 8) when the associated terminal is negative. Then when the associated transistor 140 is rendered conductive, the capacitor 130 will discharge through the resistor 132, thereby generating a momentary positive going pulse across the associated resistor 132. This voltage is coupled through the rectifier 134 to the common conductor 136 leading to the set input of the bistable L. The capacitors 130 associated with photocells 18 which are in the dark will be discharged due to the fact that ground potential appears on the associated terminals 120.

Each of the transistors 130 has a length display lamp connected between the collector electrode thereof and the "A" output terminal of the follower 67 whose circuit is shown in FIG. 9. For a lamp 70 to be energized, it is necessary for the associated transistor 140 to be conducting which grounds the bottom terminal thereof (the associated rectifier 139 isolates the lamp from ground appearing on terminal 120), and for the output terminal "A" of the follower 67 to be at a negative potential.

The "A" output terminal of the follower 67 is connected to the emitter electrode of a PNP transistor 143 (FIG. 9). The collector electrode of the transistor 143 is connected to a source of negative potential through a resistor 145. Continuity for the emitter circuit of the transistor 143 is obtained through a conductive gate transistor 140 (FIG. 8). All the transistors 140 are effectively connected in parallel in the emitter circuit of the follower transistor 143.

The base electrode of the follower transistor 143 is connected through a resistor 147 to a source of positive potential and also through a resistor 149 to the collector electrode PNP of a NOR gate transistor 151 forming part of the NOR gate N4. The collector electrode of the transistor 151 is connected through a resistor 153 to a source of negative potential. The emitter electrode of the transistor 151 is grounded. The base electrode of the transistor 151 is connected through a resistor 155 to a source of positive potential and also through resistors 157 to a number of control input points which control the operation of the NOR gate N4. As illustrated, one of these inputs is the terminal F' (FIG. 6), which is grounded when the heel and ball switches 10a' and 12a' are closed. Another one of the control input points to the transistor 151 is the output terminal D1' of the monostable multivibrator D which is grounded when the delay period is over. Another control input point to the transistor 151 is the output terminal L2' of the bistable L which is at ground potential when the bistable L is reset after the foot length measurement has been completed. The last control input point to the transistor 151 is the output terminal W2' of the bistable W which is at ground potential after the foot width measurement has been completed.

It is thus apparent that the NOR gate transistor 151 will be in a non-conductive state only when the length and width measurements have been completed following the positioning of the user's foot on the platform 4 and the termination of the delay period referred to. When transistor 151 becomes non-conductive, the resultant negative potential appearing on the collector electrode thereof is coupled to the base electrode of the transistor 143 to render the same conductive. This supplies a negative potential to the length display lamp 70 which is grounded through the associated transistor 140. It will be recalled that the transistor 140 will be in a conductive state provided the scanning circuit including the length matrix 58 has stopped scanning at the particular circuit involved.

As shown in FIG. 9, the width display bulbs 98–0 thru 98–9 associated with the various gates 96–0 and 96–9 which are similar to the transistor gate circuits including the transistors 140 just described. Each of the gates 96 includes a transistor 160 having a collector electrode connected through a resistor 162 to a source of negative potential and an emitter electrode which is grounded. The base electrode of each of the transistors 160 is connected through a resistor 163 to a source of positive potential and through a resistor 164 to the collector electrode of a transistor 166 forming part of the associated inverter amplifier 93. The emitter electrode of each transistor 166 is grounded and the collector electrode is connected through a resistor 168 to a source of negative potential. The base electrode of each transistor 166 is connected through a resistor 170 to a source of positive potential and to the associated output line of the slave matrix 94. It is thus apparent that when any one of the output lines of the slave matrix 94 is grounded, the associated transistor 166 will be in a non-conductive state and the associated transistor 160 will be in a conductive state.

Each width display bulb 98 has a terminal connected to the collector electrode of the associated transistor 160 and a terminal connected to the common output terminal A of the follower 67. Thus, after the length and width measurements are completed, and the follower transistor 143 is allowed to conduct through the transistor 160, negative potential is fed to the associated width display bulb 98 to energize the same.

Refer now to the width photocell circuit in FIG. 9. As there illustrated, each of the outputs of the width matrix 82 is connected to the wipe of a single pole double throw switch 24c forming another level of the wafer switch assembly controlled from the top of the pedestal 5. The various switches are identified by reference numbers 24c–o through 24c–29. The wipers of the switches 24c–o through 24c–29 are respectively permanently connected to the matrix output lines 82–0 through 82–29.

The No. 1 contacts of the switches 24c–o through 24c–29 are respectively connected to the base electrodes of transistors 174 of the gates 84–0 through 84–29 associated with photocells 23–0 through 23–29. When the switches 24c have their wipers on the No. 1 contacts the photocells, amplifier output are effectively scanned by the matrix 52 is the order of the photocell Nos. 0–29. This circuit arrangement is used when the right foot is being measured where width photocell 23–0 is the closest to the inside of the right foot being measured.

The No. 2 contacts of the switches 24c–0 through 24c–29 are respectively connected by contactors 174–0 through 174–29 to the contact of the switches 24c–29 through 24c–0. Thus when the switches 24c have their wipers on the No. 2 contacts the photocell amplifier outputs are effectively scanned by the matrix 82 in the inverse order of the photocell number 0–29 for a left foot width measurement.

The emitter electrodes of each of the transistors 174 is grounded and the collector electrode thereof is connected through a resistor 180 to a source of negative potential. Each collector electrode is also connected through a resistor 182 to the base electrode of a PNP transistor 184 whose emitter electrode is grounded. The base electrode of each transistor 184 is also connected through a resistor 185 to a source of positive potential. The collector electrode of each of the transistors 184 is also connected through a resistor 185 to a source of positive potential. The collector electrode of each of the transistors 184 is connected to the collector electrode of a PNP transistor 186 of a width photocell amplifier 87. The emitter electrodes of each of the transistors 186 is grounded and each of the collector electrodes thereof is connected through a resistor 188 to a source of negative potential. The base electrode of each of the transistors 186 is connected by a resistor 190 to a source of negative potential and to one of the electrodes of the associated width photocell 123 whose opposite terminal is grounded as illustrated.

A capacitor 191 is connected between each of the collector electrodes of a width photocell 186 and one end of a resistor 193 whose opposite end is grounded. The ungrounded end of each resistor 193 is also connected through a rectifier arranged to pass positive pulses to a common conductor 200 extending to the set terminal of the width bistable W.

The width photocell circuit operates in a similar manner to the length photocell circuit just described. Thus, when light strikes one of the width photocells, the resulting ground potential appearing on the base electrode of the associated transistor 186 will render that transistor nonconductive. This will place a negative potential on the collector electrode which will allow the associated capacitor 191 to become charged so that the right plate is negative and the left plate is ground as viewed in FIG. 9. This capacitor will be discharged through the associated resistor 193 to effect generation of a positive pulse which resets the bistable circuit W when the associated control transistor 184 becomes conductive. This will occur only when the associated output line of the width matrix 82 is at ground potential, namely when the particular photocell circuit is, in effect, scanned by the width matrix 82 involved.

It should be understood that numerous modifications may be made in the preferred embodiment of the invention described above without departing from the broad aspects of the invention. For example, the preferred aspect of the invention wherein a longest size select circuit is provided for effecting the longest shoe size required by the heel to ball and heel to toe length of the foot being measured could be replaced by a circuit which effects display of the shortest shoe size required by these measurements or a shoe size bearing some other relation to the length measurements involved.

I claim:

1. Shoe size indicating apparatus comprising: a housing having a platform with a foot-receiving area thereon, a foot positioning abutment along a longitudinal margin of said foot-receiving area to form an abutment surface for the inner margin of a foot from which the ball portion of the foot projects, first means responsive to the length of the foot placed against the abutment surface for providing an output indicating the shoe length classification apparently required by the length of the foot involved, second means responsive to the heel to ball length of the foot placed against said abutment surface for providing an output indicating the shoe length classification apparently required for the heel to ball length of the foot involved, and means responsive to the outputs of said first and second means for providing a visual indication of the largest shoe length classification required by the foot being measured as indicated by the outputs of said first and second means.

2. The apparatus of claim 1 wherein said second means includes switch means and switch operating arm means projecting from said abutment surface, the arm means being sufficiently stiff to actuate the switch means when depressed by the bone of the ball of the foot but not by the soft fleshy part of the foot engaging the same, and means responsive to the actuation of the said switch means to provide said output indicating the shoe length classification apparently required by the heel to ball length of the foot involved.

3. Shoe size measuring apparatus for indicating shoe length in numerical terms directly related to foot length, and shoe width in arbitrary terms which provide a number of shoe width classifications where the proper shoe width classification is related to foot length as well as actual foot width and wherein, for a given foot length, progressively increasing shoe width classifications apply in accordance with foot widths progressively increasing from a minimum foot width which varies with the foot length, said apparatus comprising: a foot receiving stand having an elongated foot receiving area on the top thereof upon which the user's foot is to be placed, foot positioning means for precisely locating the user's foot along the length of said area, a series of foot actuable length sensing means spaced along the length of said area for providing a measure of foot length, a series of foot actuable width sensing means spaced along the width of said area for providing a measure of foot width, first scanning means for sequentially scanning said series of length sensing means in a sequence corresponding to the progessive variation in the foot lengths they represent and including length counter means whose count varies with the length sensing means scanned, first detecting means responsive to the scanning of the length sensing means indicating the length of the foot involved for storing the count in said length counter means, second scanning means for sequentially scanning said width sensing means in a sequence corresponding to the progressive variation in the foot width they represent and in synchronism with the scanning of the length sensing means so that the width sensing means initially scanned when a length sensing means is scanned corresponds to the minimum shoe width required by the length classification assigned to the length sensing means being scanned, shoe width counter means whose count varies with the change in the width sensing means scanned for indicating the desired shoe width classification, means for normally inhibiting the operation of said shoe width counter means until the count is stored in said length counter means, second detecting means for detecting when said second scanning means scans width sensing means indicating the width of the foot involved and for then storing the count in said shoe width counter means, and means responsive to said stored count in said length and shoe width counter means for indicating the shoe length and width classifications required for the foot involved.

4. Shoe size measuring apparatus for indicating shoe length in numerical terms directly related to foot length, and shoe width in arbitrary terms which provide a number of shoe width classifications where the proper shoe width classifications are related to foot length as well as actual foot width and wherein, for a given foot length, progressively increasing shoe width classifications apply in accordance with foot widths progressively increasing from a minimum foot width which varies with the foot length, said apparatus comprising: a foot receiving stand having an elongated foot receiving area on the top thereof upon which the user's foot is to be placed, foot positioning means for precisely locating the user's foot along the length of said area, a series of foot actuable length sensing means spaced along the length of said area for providing a measure of foot length, a series of foot actuable width sensing means spaced along the width of said area for providing a measure of foot width, first scanning means for sequentially scanning said series of length sensing means in a sequence corresponding to the progressive variation in the foot lengths they represent and including length counter means whose count varies with the length sensing means scanned, first detecting means responsive to the scanning of the length sensing means indicating the length of the foot involved for storing the count in said length counter means, second scanning means for sequentially scanning said width sensing means in a sequence corresponding to the progressive variation in the foot width they represent and in synchronism with the scanning of the length sensing means so that the width sensing means initially scanned when a length sensing means is scanned corresponds to the minimum shoe width required by the length classification assigned to the length sensing means being scanned, shoe width counter means whose count varies with the change in the width sensing means scanned for indicating the desired shoe width classification and which holds a count which is greater than the number of said shoe width classification, means for normally inhibiting the operation of said shoe width counter means until said first detecting means holds the count in said length counter means, second detecting means for detecting when said second scanning means scans a width sensing means indicating the width of the foot involved and for then storing the count in said shoe width counter means, means responsive to said stored count in said length and shoe width counter means for indicating the shoe length and width classification required for the foot involved, and means for indicating the need for a special shoe width when said shoe width counter means has a count greater than said number of shoe width classifications.

5. Shoe size measuring apparatus for indicating shoe length in numerical terms directly related to foot length, and shoe width in arbitrary terms which provide a number of shoe width classifications where the proper shoe width classifications are related to foot length as well as actual foot width and wherein, for a given foot length, progressively increasing shoe width classifications apply in accordance with foot widths progressively increasing from a minimum foot width which varies with the foot length, said apparatus comprising: a foot receiving stand having an elongated foot receiving area on the top thereof upon which the user's foot is to be placed, foot positioning means for precisely locating the user's foot along the length of said area, a series of foot actuable length sensing means spaced along the length of said area for providing a measure of foot length, a series of foot actuable width sensing means spaced along the width of said area for providing a measure of foot width, first scanning means for sequentially scanning said series of length sensing means in a sequence corresponding to the progressive variation in the foot lengths they represent and including length counter means where count varies with the length sensing means scanned, first detecting means responsive to the scanning of the length sensing means indicating the length of the foot involved for storing the count in said length counter means, second scanning means for sequentially scanning said width sensing means in a sequence corresponding to the progressive variation in the foot width they represent and in synchronism with the scanning of the length sensing means so that the width sensing means initially scanned when a length sensing means is scanned corresponds to the minimum shoe width required by the length classification assigned to the length sensing means being scanned, shoe width counter means whose count varies with the change in the width sensing means scanned for indicating the desired shoe width classification, means for normally inhibiting the operation of said shoe width counter means until said first detecting means holds the count in said length counter means, second detecting means for detecting when said second scanning means scans a width sensing means indicating the width of the foot involved and for then storing the count in said shoe width counter means, means responsive to said stored count in said length and shoe width counter means for indicating the shoe length and width classification required for the foot involved, and means for indicating the need for a special shoe width when said second detecting means scans a width sensing means indicating the width of the foot involved before said first detecting means detects the scanning of the length sensing means indicating the length of the foot involved.

6. Shoe size measuring apparatus for indicating shoe length in numerical terms including half size directly related to foot length, and shoe width in arbitrary terms which provide a number of shoe width classifications where the proper shoe width classifications are related to foot lengths as well as actual foot widths and wherein for a given foot length progressively increasing shoe width classifications apply in accordance with foot widths progressively increasing from a minimum foot width which varies with full size changes in foot length, said apparatus comprising: a foot receiving stand having an elongated foot receiving area on the top thereof upon which the user's foot is to be placed, foot positioning means for precisely locating the user's foot along the length of said area, a series of foot actuable length sensing means spaced along the length of said area and providing a measure of foot length, a series of foot actuable width sensing means spaced along the width of said area for providing a measure of foot width first scanning means for sequentially scanning said series of length sensing means in a sequence corresponding to the progressive variation in the foot lengths they represent and including length counter means whose count varies with the length sensing means scanned and first actuating means responsive to the scanning of the length sensing indicating the length of the foot involved by storing the count in said length counter means, second scanning means for sequentially scanning said width sensing means in a sequence corresponding to the progressive variation in the foot width they represent and in synchronism with the scanning of the length sensing means so that the width sensing means initially scanned when a length sensing means is scanned corresponds to the minimum shoe width required by the length classification assigned to the length sensing means being scanned, said second scanning means including width counter whose count varies with the foot width assigned to the sensing means scanned, slave counter means whose count varies with the count in said width counter means for indicating the desired shoe width classification, means for normally inhibiting the operation of said slave counter means until the count is held in said length counter means, second detecting means for detecting when said second scanning means scans a width sensing means indicating the width of the foot involved and for then storing the count in said slave counter means, and means responsive to said stored counts in said length and slave counter means for indicating the shoe length and width classifications required for the foot involved.

7. An automatic shoe size measuring and indicating system comprising: a foot receiving stand having an elongated foot receiving area on the top thereof upon which the user's foot is to be placed, foot positioning means adjacent to said area for precisely locating the user's foot along the length of said area, a first series of foot actuable sensing means spaced along the length of said area for providing a measure of the shoe length for the foot length involved, a second series of sensing means spaced along the length of said area to be actuated by the ball of the foot for providing a measure of the normal proper length classification of a shoe corresponding to the length between the heel and ball of the foot being measured in accordance with the particular sensing means actuated by the ball of the foot involved, and circuit means responsive to both said first and second sensing means for giving a visual indication of the proper shoe length classification size in accordance with a predetermined relation between the shoe length indicated respectively thereby, said circuit means including means for displaying the longest shoe size called for by the actuated ones of said first and second series of sensing means.

8. An automatic shoe size measuring and indicating system comprising: a foot receiving stand having an elongated foot receiving area on the top thereof upon which the user's foot is to be placed, foot positioning means adjacent to said area for precisely locating the user's foot along the length of said area, a first series of foot actuable sensing means spaced along the length of said area for providing a measure of the shoe length for the foot length involved in accordance with the number of actuated sensing means, a second series of sensing means spaced along the length of said area to be actuated by the ball of the foot and for providing a measure of the normal proper length of shoe corresponding to the length between the heel and ball of the foot being measured in accordance with the particular sensing means actuated by the ball of the foot involved, a third series of foot actuable sensing means spaced along the width of said area for providing a measure of the shoe width for the foot width involved in accordance with the number of actuated sensing means, a first, second and third series of output circuits which respectively indicate the actuated conditions of the various sensing means of said first, second and third series of sensing means, first scanning means for scanning said first series of output circuits in a sequence corresponding to the progressive increase in variation in the shoe lengths they represent and including length counter means whose count progressively varies with the shoe length represented by the actuation of the sensing means associated with the output circuit being scanned, and count holding means for holding the count of the length counter means when an output circuit is scanned giving an indication which is different from that of the previously scanned output circuit, respective output state modifying means associated with the third series of output circuits, each of said output state modifying means including means responsive to an output circuit indication representing the actuation of the associated sensing means for artificially ensuring an actuated condition indication at the output circuit of the first series of sensing means associated with all shoe sizes which are smaller than the shoe length represented by the actuated associated sensing means of the third series of sensing means, and means for displaying the shoe size represented by the count held in said length counter means.

References Cited
UNITED STATES PATENTS

| | | | |
|---|---|---|---|
| 1,529,167 | 3/1925 | Clausing | 33—3.4 |
| 2,630,043 | 3/1953 | Kolisch | 88—14 |
| 2,668,203 | 2/1954 | Martin | 200—61.41 |
| 2,708,368 | 5/1955 | Kolisch | 33—174 |
| 2,820,877 | 1/1958 | Oates | 200—61.41 |
| 2,975,519 | 3/1961 | Berlin et al. | 33—3.4 |
| 3,123,681 | 3/1964 | Martini | 200—33 |

LEONARD FORMAN, *Primary Examiner.*

L. V. ANDERSON, *Assistant Examiner.*